(12) United States Patent
Ponzio et al.

(10) Patent No.: US 6,959,486 B2
(45) Date of Patent: Nov. 1, 2005

(54) APPARATUS FOR GRIPPING WIRE IN AN ARMATURE WINDING MACHINE

(75) Inventors: Massimo Ponzio, Barberino V. Elsa (IT); Rubino Corbinelli, Poggibonsi (IT)

(73) Assignee: Atop S.p.A., Barberino V. Elsa (IT)

( * ) Notice: Subject to any disclaimer, the term of this patent is extended or adjusted under 35 U.S.C. 154(b) by 109 days.

(21) Appl. No.: 10/154,284

(22) Filed: May 23, 2002

(65) Prior Publication Data

US 2003/0029958 A1 Feb. 13, 2003

(30) Foreign Application Priority Data

May 23, 2001 (EP) ............................................ 01830335

(51) Int. Cl.⁷ ................................................. B23P 19/00
(52) U.S. Cl. ............................ 29/735; 29/733; 29/736; 29/564.5; 29/597; 242/433.4
(58) Field of Search ....................... 29/732, 735, 564.5, 29/736, 596, 598, 605, 606; 140/92.2; 242/433.3, 433.4, 430, 432.6

(56) References Cited

U.S. PATENT DOCUMENTS

| | | | |
|---|---|---|---|
| 4,520,965 A * | 6/1985 | Kimura et al. ........... | 242/433.3 |
| 4,826,092 A | 5/1989 | Tsugawa | |
| 5,855,058 A * | 1/1999 | Lewchenko et al. .......... | 29/735 |
| 6,009,618 A * | 1/2000 | Takahata et al. ............... | 29/736 |
| 6,612,519 B1 * | 9/2003 | Becherucci et al. ...... | 242/432.6 |
| 6,615,479 B2 * | 9/2003 | Hiei .......................... | 29/564.5 |
| 2001/0045487 A1 * | 11/2001 | Stratico et al. .......... | 242/433.4 |

FOREIGN PATENT DOCUMENTS

EP          0989659          3/2000

OTHER PUBLICATIONS

European Search Report for EP01830335.4.

* cited by examiner

*Primary Examiner*—Minh Trinh
(74) *Attorney, Agent, or Firm*—Simpson & Simpson, PLLC

(57) ABSTRACT

An apparatus for gripping temporarily the wire in an armature winding machine. The machine is of the type comprising a gripper formed by an arm (11) having an end (13) connected to a support (14) and the other free end (12) for gripping the wire. The free end (12) moves between a first position where it is approached to a winding zone and a second position where it is withdrawn from the winding zone. The gripper (12) translates then parallel to itself and integrally to the support (14), in vertical direction. The translation is operated by rotation of a driven axis (17) according to a predetermined function movement/time, whereby at each angular position of the axis a position of the gripper (12) univocally corresponds intermediate between the first and second position. The following advantages arise: the approach and withdrawal of the gripper from the commutator are very precise owing to axis control as position, speed and acceleration; the movement that the gripper (12,22) causes for cutting the wire can be controlled in a way different from that of withdrawal, in order to obtain a cut most favorable on the hook; the movement that the gripper causes for cutting the wire does not change angle of the stretched wire with respect to the hook of the commutator (3), in order not to cause the wire to slide on the hook.

5 Claims, 5 Drawing Sheets

APPARATUS FOR GRIPPING WIRE IN AN ARMATURE WINDING MACHINE

CROSS REFERENCE TO RELATED APPLICATION

The present application claims benefit to European Patent Application No. EP 01830335.4, filed on May 23, 2001.

FIELD OF THE INVENTION

The present invention relates to the field of special machines and precisely it relates to a method for gripping temporarily the wire and cutting it on the hook of the commutator in an armature winding machine.

Furthermore, the invention relates to a device that carries out this method.

BACKGROUND OF THE INVENTION

In armature winding machines, the wire being wound in the slots of the armature is cut at the hook on the commutator. The cutting step is carried out normally by means of pulling the wire cut it on the sharp profile of the hook. This way ends of wire are prevented from extending beyond the hook.

Furthermore, in the change from an armature already wound to the following unwound armature, the terminal portion of the wire has to be temporarily gripped so that it is available to the flier for the next hooking step.

Both for cutting the wire and for maintaining it temporarily a collet/cutter can be used as in U.S. Pat. No. 4,826,092 or, alternatively, a "gripper" tool, as in EP0989659.

The gripper consists in a movable arm having at the end an holding element. Normally two gripper tools are provided for each armature to be wound, one for each flier. An upper gripper is arranged above the commutator and a lower gripper under the commutator, both laying in the winding machine vertical plane of symmetry, that at the two fliers at opposite sides.

Typical steps for each gripper tool for gripping temporarily the wire and cutting it on the hook of the commutator are the following:

at the end of a winding step on an armature the support of the gripper moves forward and the gripper approaches the commutator clamping the stretched wire that extends from the flier to the commutator;

the wire is wound about the hook creating an α-shaped loop;

the gripper carries out then a quick and brief backward movement from the hook so that the wire is cut; the cut wire end is therefore close to the hook of the wound armature;

the gripper moves away, whereby on it the other cut end of the wire is present, that comes from the flier; the wound armature is carried away and a new armature to be wound is automatically presented;

the gripper is lowered again and the wire is wound about a hook of the new armature creating another α-shaped loop;

the armature effects then a quick and brief movement of rotation, and owing to a relative movement between gripper and armature the wire is pulled against a sharp edge of the hook that causes a further cut, so that an end belongs to the segment of wire already present on the gripper and the other end is wound on the hook and belongs to the wire coming from the flier;

the gripper moves back to a stand-by position and releases the segment that falls, while the winding starts again;

at the end of winding the above steps are repeated.

The cycle exemplified above is that normally used in a winding machine of two poles armatures; similar cycles are possible for winding armatures with more poles.

The step of releasing the wire segment that falls thus in a container located beneath is somewhat different for the upper gripper. In fact, the upper gripper carries out in some way a movement of deviating from the vertical of the commutator before releasing the segment. The lower gripper, instead, is in a more favourite position, because it has not devices that block the fall of the segment, and it has not to deviate.

The grippers according to the prior art are normally hinged to a support in order to carry out the movements of approach/withdrawal from the winding zone by means of a rotation about a pin by means of a pneumatic actuator.

The problems that arise with the existing grippers are the following:

the approach and withdrawal movements of the gripper with respect to the commutator even if quick, are not enough precise for allowing a control of the stroke;

without control it is not possible to adjust the movement of the gripper according to the cross section of the wire, the shape of the hook, the diameter of the commutator, since the pneumatic drive does not allow this flexibility;

at the moment of the cut the wire must have a trajectory at most limited, in order to remain as far as possible within the hook and without interfering with the end of the wire already present;

the movement of withdrawal of the gripper from the commutator provides a rotation in the vertical plane that causes the gripper to follow a circular trajectory, and this causes a variation of angle of the stretched wire from the commutator to the gripper, with the consequence that the wire has a brief diversion on the hook before cutting, thus spoiling the end of the wire previously cut.

Furthermore, whereas below the lower gripper there are not further elements that block the fall of the segment, the upper gripper must bring the segment far from the vertical of the commutator before releasing it. In this case:

the withdrawal of the upper gripper for releasing the segment has to be fact in order to not obstruct the flier while winding;

the segment of wire has to be released safely, to avoid that remains on the gripper and spoils the next hooking step.

SUMMARY OF THE INVENTION

It is therefore object of the present invention to provide a method for gripping temporarily the wire and cutting it on the hook of the commutator in an armature winding machine of electric motors that fulfils the needs above indicated and has not the problems of the prior art.

It is another object of the invention to provide a gripper for armature winding machines that carries out this method.

It is a particular object of the invention to provide such a method wherein:

the movements of approach and withdrawal of the gripper from the commutator are controllable as position, speed, acceleration;

control is possible also in case of change of the cross section of the wire, of the shape of the hook, of the diameter of the commutator;

the cutting movement of the gripper avoids a variation of angle of the stretched wire with respect to the hook of the commutator, in order not to cause the wire to slide on the hook.

It is another particular object of the invention to provide such a method wherein the upper gripper can be operated so that:

the movement of withdrawal for releasing the segment do not obstacle the flier when winding;

the segment of wire is released safely avoiding that it can remain attached to the gripper and affect the winding steps.

These and other objects are achieved by the method according to the invention for gripping temporarily the wire in an armature winding machine, whose characteristic is that the free end of a wire gripping rod, in the moving from a winding zone to a withdrawn position, translates parallel to itself.

Advantageously, the gripper extends in a vertical plane substantially passing through the plane of symmetry of the flier of the winding machine and the movement from the first to the second position or vice versa is a translation in vertical direction.

Preferably, the translation of the support is operated by the rotation of a driven axis whereby at each angular position of the axis corresponds univocally a intermediate position of the gripper between the first and second position.

The translation can be generated according to a predetermined function movement/time, whereby the movement of withdrawal for cutting the wire and the movement of withdrawal for bringing the gripper away from the winding zone are carried out at different speeds and/or accelerations.

The forward/backward movement of the support on a horizontal plane is operated by the rotation of a same drive axis that operates said driven axis, means being provided for disengaging selectively the driven axis from the movement of approach/withdrawal of the support for translating the support on the horizontal plane, whereby with a single drive axis both the movements are obtained.

Alternatively, the translation of the support for the approaching/withdrawal movement and/or the forward/backward movement are operated by a linear motor, whereby at each position of the linear motor corresponds univocally a position of the gripper.

Always according to the invention, for gripping temporarily the wire in an armature winding machine, a gripper formed by an arm having an end connected to a support and the other free end for gripping the wire has the characteristic that the movement of the free end between a winding zone and a withdrawn position is obtained by means of controlled rotation of a driven axis, whereby at each angular position of said axis corresponds a position of said free end.

According to another aspect of the invention, an apparatus for gripping temporarily the wire in an armature winding machine comprises:

a gripper formed by an arm having an end connected to a support and the other free end having means for gripping the wire, means for moving the free end between a first position where it is approached to a winding zone and a second position where it is withdrawn from the winding zone, wherein said means for moving comprise a guide and a slide for translating the arm integrally to the support so that the free end for gripping the wire translates from the first to the second position and vice versa.

Preferably, the means for moving are associated to a driven axis by a transmission means so that at each angular position of the axis corresponds univocally an intermediate position of the gripper between the first and second position.

Advantageously, means are provided for controlling the translation of the gripper by means of control of the rotation of the driven axis according to a predetermined function movement/time.

The driven axis has advantageously a screw portion that crosses a joint formed by a first and a second unit connected by means of a coupling, the first unit having a rotatable inner portion that is a nut screw put into rotation by a drive shaft, whereby if the first unit is disengaged from the second there is the rotation of said driven axis, whereas if the first unit is connected to the second by means of said coupling, said driven axis cannot rotate and said first and second unit translate integrally, causing the forward/backward movement of the driven axis.

Always according to the invention, for gripping temporarily the wire in an armature winding machine, a gripper formed by an arm having an end connected to a support and the other free end for gripping the wire has the characteristic that means are provided for operating the movement of the free end between a winding zone and a withdrawn position, said means for operating being associated to a driven axis, whereby at each angular position of said axis corresponds a position of said free end.

BRIEF DESCRIPTION OF THE DRAWINGS

Further characteristics and the advantages of the method and of the device according to the invention will be made clearer with the following description of an embodiment thereof, exemplifying but not limitative, with reference to the attached drawings, wherein.

DETAILED DESCRIPTION OF THE PREFERRED EMBODIMENT

Figure 1:
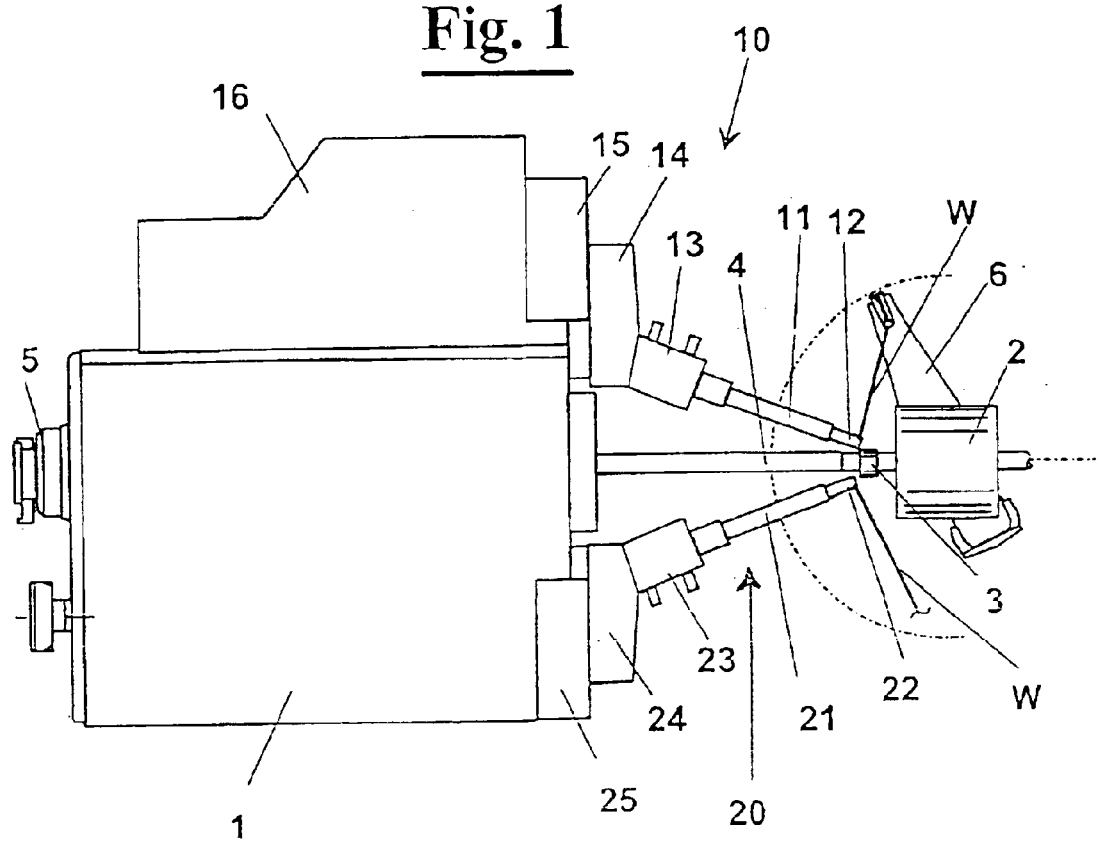
FIGS. 1 and 2 are an elevational side view and top plan view from the above of an support and index unit of an armature of an armature winding machine comprising a gripper device according to the invention.
Figure 2:
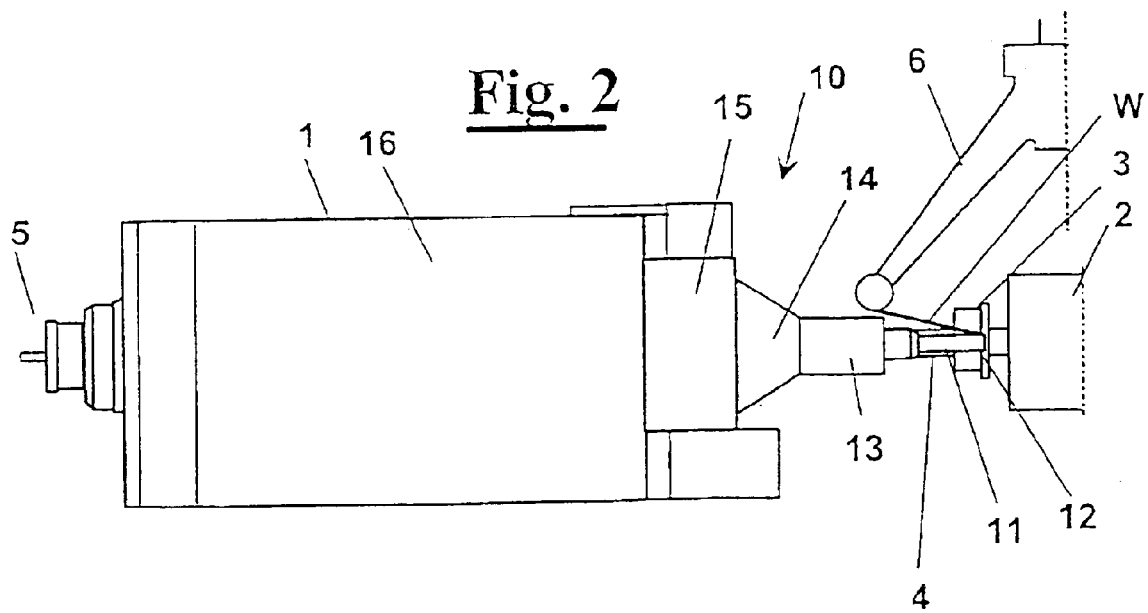

With reference to FIGS. 1 and 2, in an armature winding machine, an unit 1 contains the indexing mechanics 5 of armature 2 with relative support collet 4. While the armature is held by collet 4, the wire is wound by means of fliers 6 that also feed the wire W. Furthermore, it comprises devices 10 and 20 according to the invention for gripping temporarily the wire W and cutting it on the hook of commutator 3 of armature 2.

The upper 10 and lower 20 wire gripping devices comprise each an arm 11, 21 to whose end a gripper 12, 22 is provided that can be operated in a pneumatic way by means of an actuator 13, 23 that is integral to a slide 14, 24. The arm 11, 21, respectively upper and lower, are inclined so that gripper 12, 22 can approach at most to commutator 3. In FIG. 1 is shown the situation of commutator of minimum diameter, wherein the two gripper devices 12, 22 are in the position of maximum relative approach.

Figure 3:
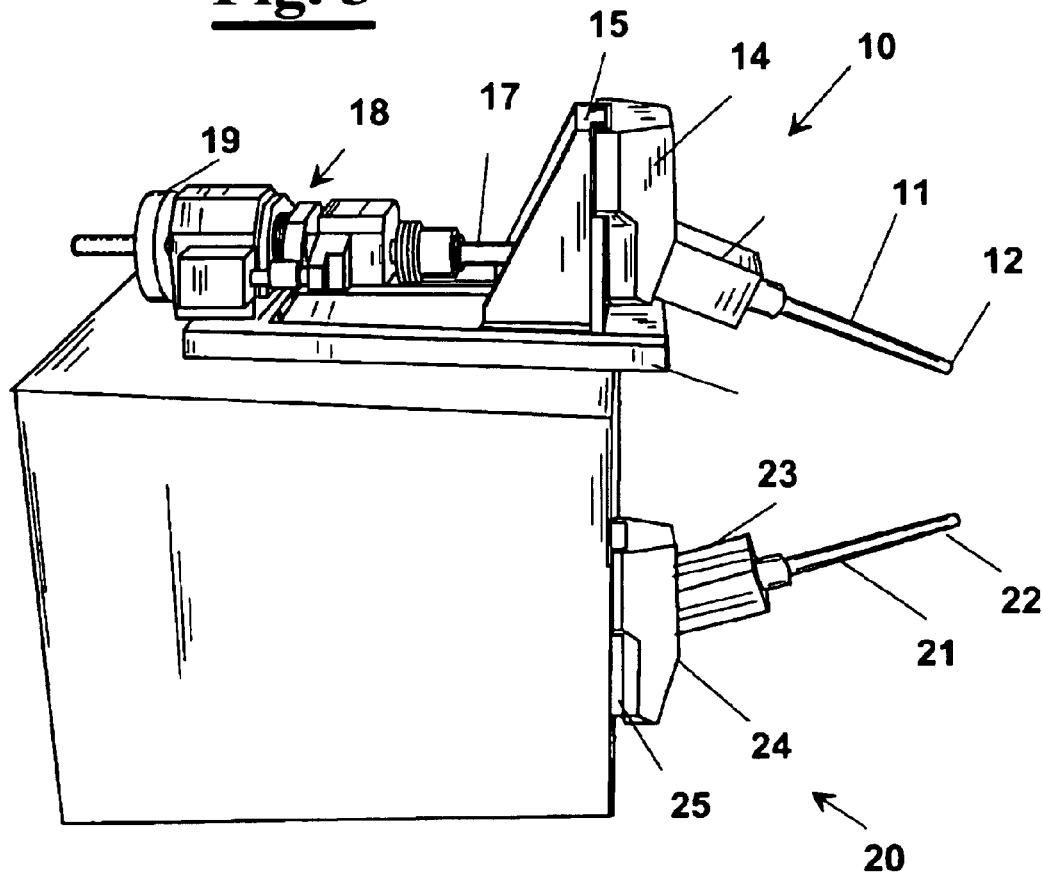
FIG. 3 is a perspective view of the device of FIG. 1, without showing the armature and the relative support, with gripper distanced and withdrawn.
Figure 4:
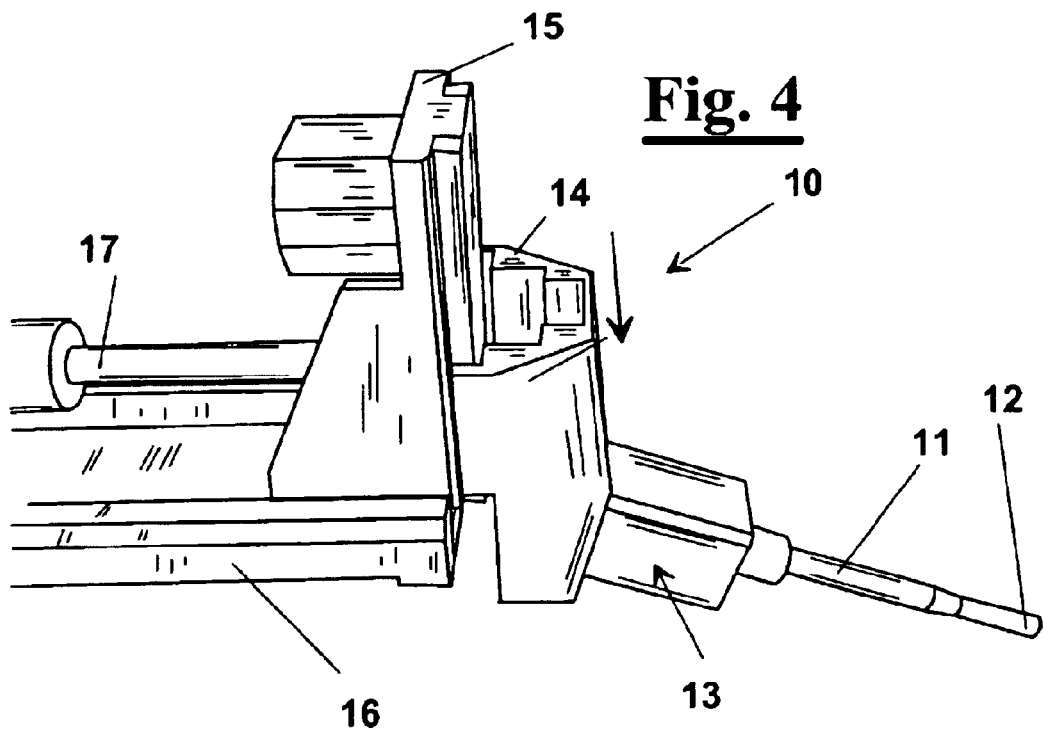
FIG. 4 is a perspective view of the upper gripper in lowered position.

As shown also in FIG. 3 and in FIG. 4, the slides 14,24 move vertically respectively on a guide 15, 25 in order to translate the arms 11, 21 integrally to themselves. This way, gripper 12, 22 approach and withdraw from the commutator according to a vertical line in order to pull the wire, in the withdrawing step, without changing the angle of the wire with respect to the hook, thus overcoming the drawback present in the systems of prior art.

The vertical movement of the slides 14,24 on guides 15,25, in the present example that is the preferred embodiment, is respectively obtained by means of the rotation of shafts 17,27.

Figure 5:
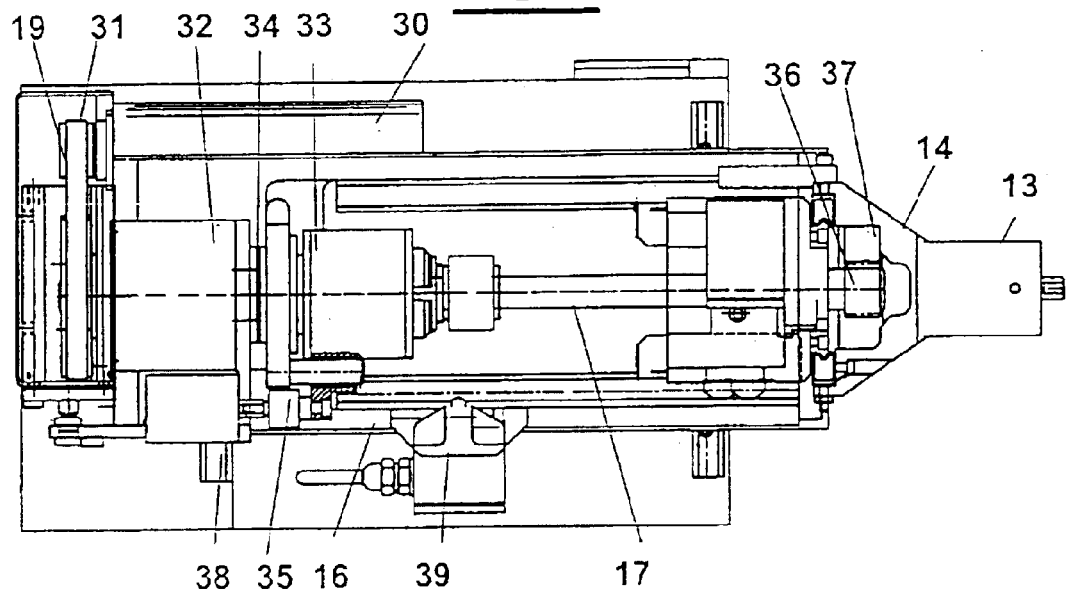
FIGS. 5 and 6 are respectively a top plan view and sectional longitudinal view from the above of the actuating device of the upper gripper.
Figure 6:
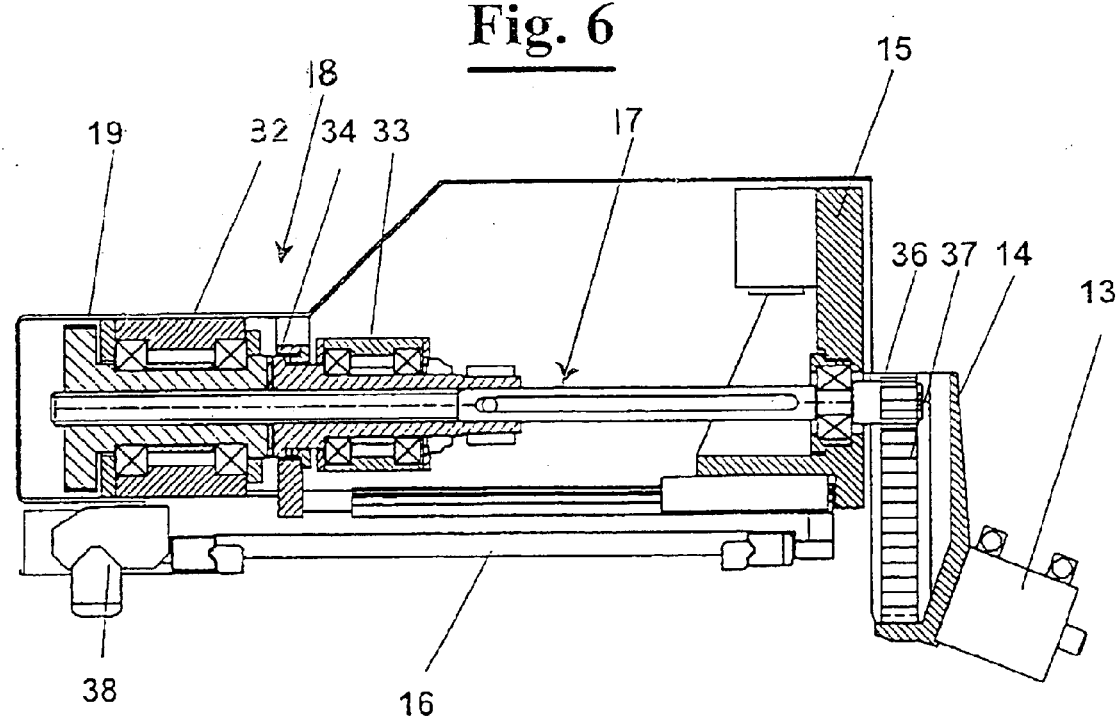

With reference also to FIGS. 5 and 6, concerning the device 10 actuating upper gripper 12, shaft 17 has at an end a pinion 36 that engages with a toothed rack 37 which is integral to slide 14. This way, with the rotation of shaft 17, in a way controllable with precision according to the angular position of the shaft same, a relative movement is created between slide 14 and guide 15, allowing the controlled movement of withdrawal and approach for translating gripper 12 towards commutator 3.

Shaft 17 has at the end opposite to that where pinion 36 is present, a gear 19 that engages with a gearing 31 put into rotation by a motor 30.

Shaft 17 has a screw portion that crosses a joint 18 formed by two units 32 and 33 that are connected by means of a coupling 34. Unit 32 has the rotatable inner portion that is a nut screw and is integral to gear 19. If units 32 and 33 are coupled, the rotation of gear 19 is carried out integrally to shaft 17 causing the sole rotation of gearing 36 on pinion 37, and then the relative movement of slide 14 on guide 15. By separating units 32 and 33 always by means of actuator 35, shaft 17 cannot rotate any more, whereby the rotation of gear 19 is turned into its screwing/unscrewing with respect to shaft 17, which causes the shaft same to translate horizontally thus dragging vertical guide 15 on horizontal guide 16. This is possible when slide 14 is in raised position, such as for example in FIG. 3. This horizontal translation for causing the forward/backward movement of gripper 12 is effected then in a quick way always with the rotation of the same motor 30 that operates also the movement of approaching/withdrawal.

The upper gripper 12 can be withdrawn in a relevant way from commutator 3, to release the segment during winding without impeding flier 6, simply translating all device 10, owing to a preferred speed and acceleration profile operable by means of motor 30; this way, the segment of wire is released safely to avoid that it remains on the gripper and affects the steps of hooking. The structure that can be used for vertical translating the upper gripper slides quickly on the guide 16 by means of the same motor 30, without then need of a further pneumatic cylinder but the simple use of coupling 18.

This translation can however be obtained, alternatively, by means of either a pneumatic actuator, or a further motor with controlled axis.

Slide 16 can be in turn translated in transversal horizontal direction on guide 38 (FIGS. 5 and 6) by means of a short stroked pneumatic actuator 39 for moving gripper 12 away from the vertical line of armature 2, so that the segment falls without affecting winding. This transversal translation has also the task of bringing the gripper to an eccentric position with respect to the winding zone, as is required in case of winding certain types of armatures. According to an embodiment of the invention, this movement can be in turn executed by means of a controlled axis motor.

Figure 7:
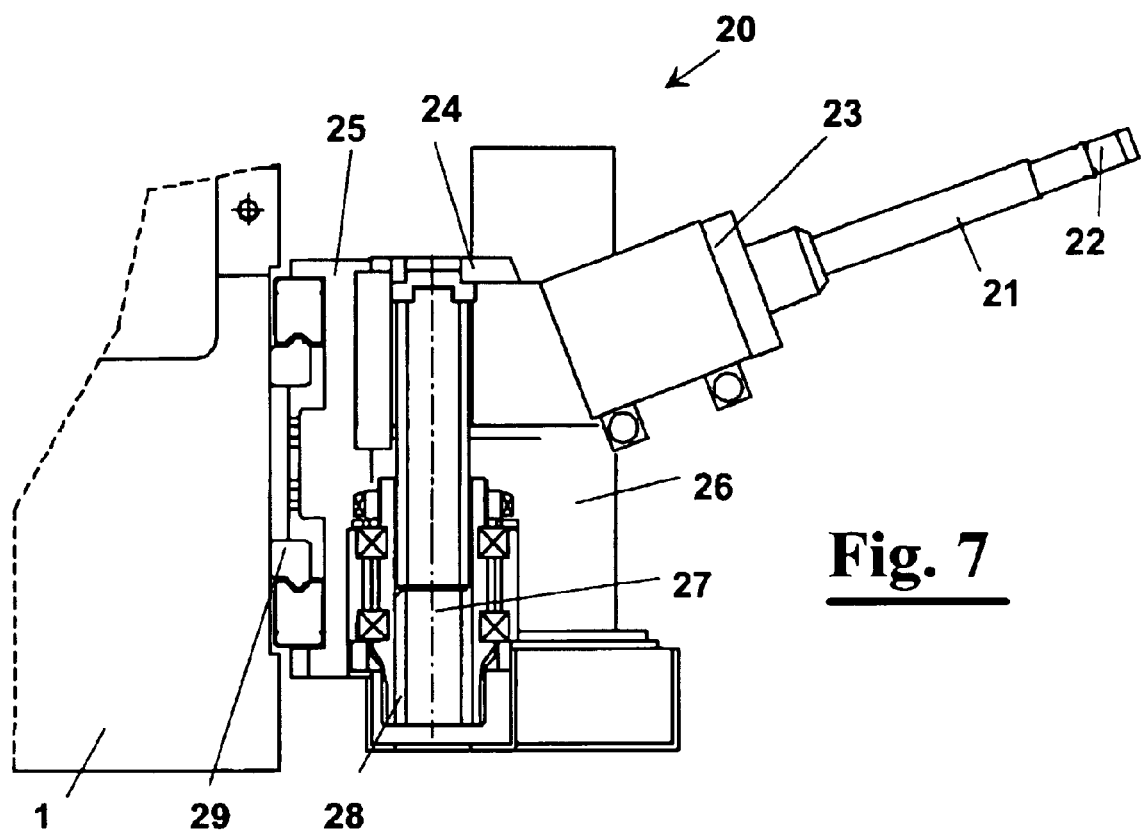
FIG. 7 is a sectional longitudinal view of the actuating device of the lower gripper.
Figure 8A:
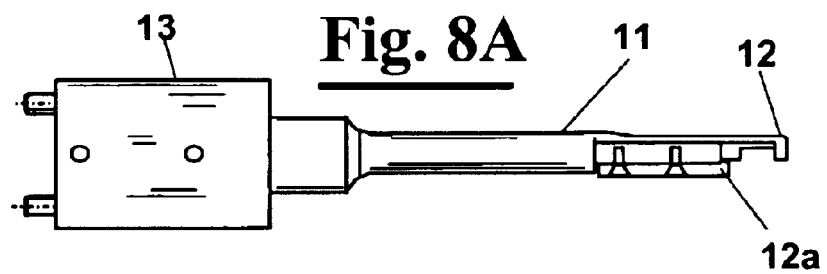
FIGS. 8A, 8B and 9 are a detailed view of the gripper in two operative positions and in cross section at the free end.
Figure 8B:
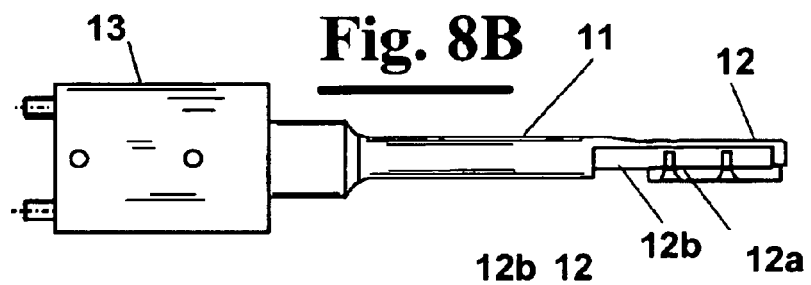
Figure 9:
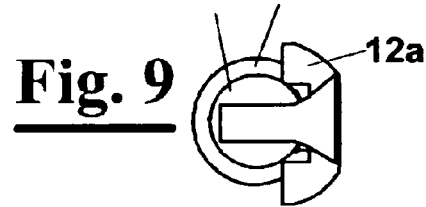

With reference to FIG. 7, for lower gripper 22 a similar system is provided of vertical translation of the slide 24 on guide 25. For this reason, a motor 26 is provided that by means of gearing 28 rotates shaft 27 which, by means of a screw engagement, controls the vertical movement of slide 24. Guide 25 can in turn translating horizontally on rails 29 for bringing the gripper in eccentric position with respect to the winding zone. Also for the lower gripper this movement can be executed by means of a controlled axis motor.

The following advantages arise:

The approach and withdrawal movements of the gripper towards/from the commutator are very precise by means of the axis control on motor 26 for lower gripper 22 and on motor 30 for upper gripper 12, concerning position, speed and acceleration;

the movement that gripper 12,22 causes for cutting the wire can be controlled in a way different from that of withdrawal, in order to obtain a most favourable cut on the hook;

owing to the vertical translation of arms 11,21 integral to slides 14,24, the movement that grippers 12,22 cause for cutting the wire does not change angle of the stretched wire with respect to the hook of commutator 3, in order not to cause the wire to slide on the hook.

Figure 10:
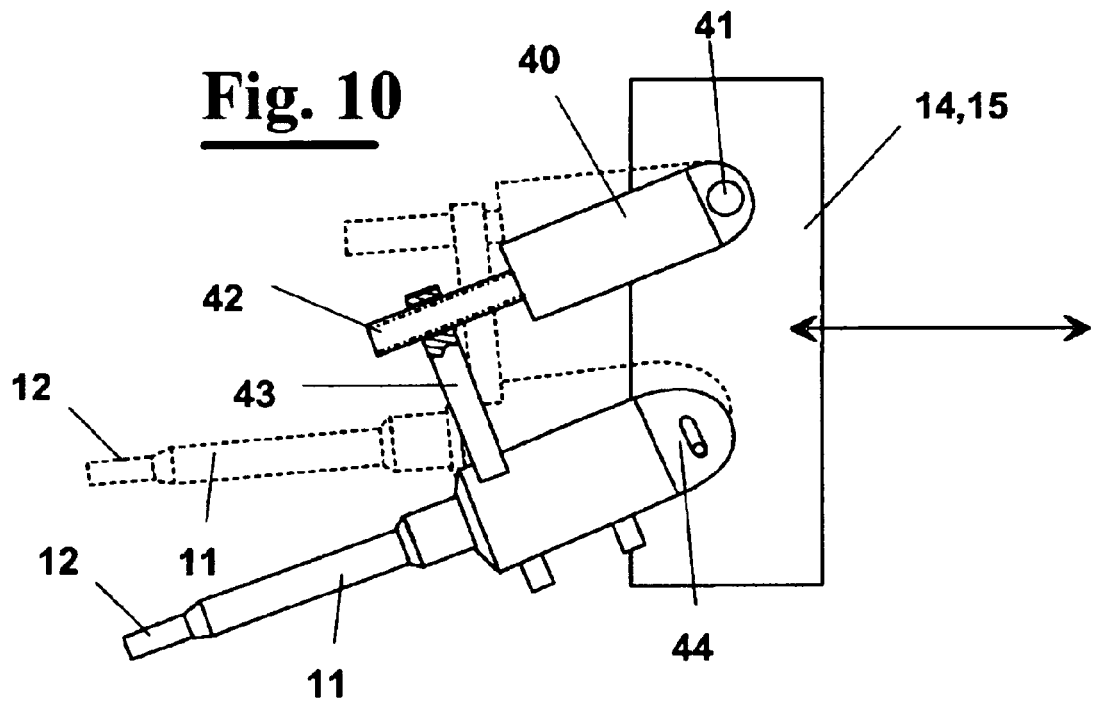
FIGS. 10 and 11 are a diagrammatical view of two possible embodiments of the gripper with movement of approaching-withdrawal operated by the rotation of a driven axis.

The main concept of axis control of the withdrawal/approaching movement of the gripper with respect to the armature can be obtained also with a rotation of the gripper (FIGS. 10 and 11), always remaining within the scope of the present invention. With reference to FIG. 10, on support 15 a motor 40 is mounted hinged at 41 and operating a screwed drive axis 42, which engages with a nut screw 43. It is connected to arm 11 of gripper 12, which is pivotally connected in 44 to the support 15. This way, at each angular position of shaft 42 an angular position corresponds of arm 11, with the same above advantages of controlling position, speed and acceleration of gripper 12. The support 15 can translate horizontally, if necessary, by a further actuator with controlled axis or by a piston. In the first case, the kinematic combination between the two motions of the two controlled axes causes gripper 12 to follow a desired trajectory chosen.

Figure 11:
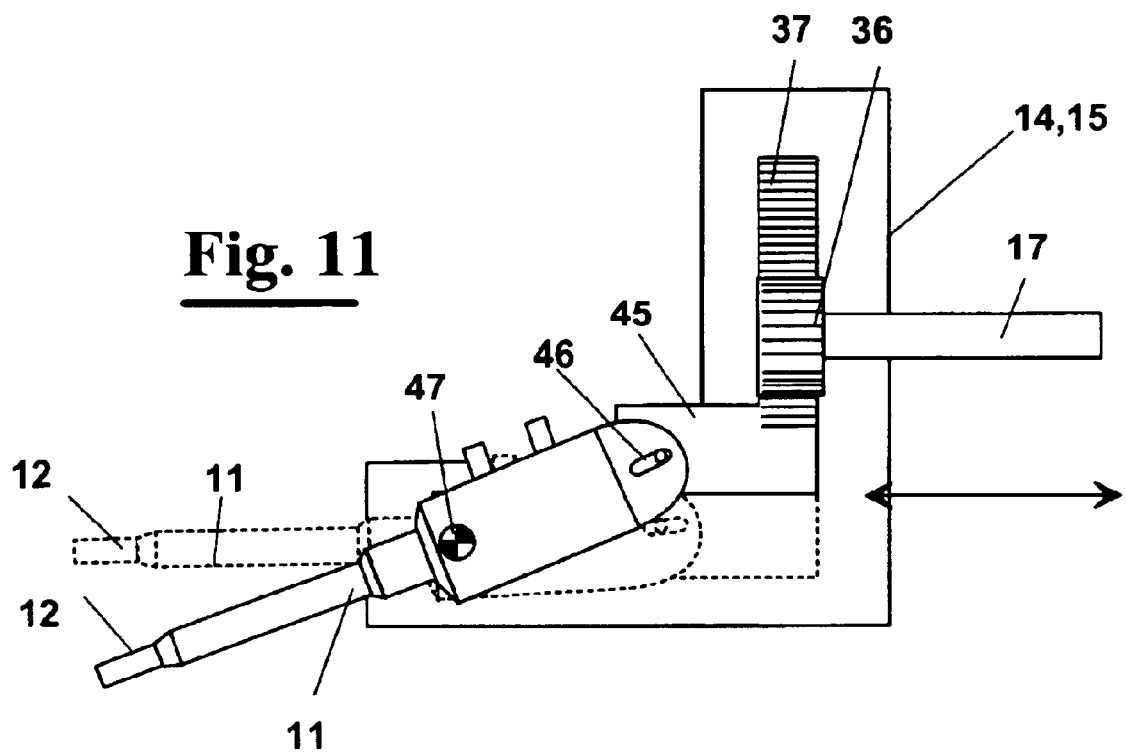

If a single motor for rotating the gripper and for translating the support 15 has to be used, the exemplifying configuration of FIG. 11 is also possible, wherein pinion 36 causes a rack 37 to move integral to a movable bracket 45. To bracket 45, at 46, the arm 11 of gripper 12 is pivotally connected, which is in turn hinged to support 15. This way the rotation of axis 17 causes the rotation of gripper 12. Also in this case a kinematic combination between the translation of support 15 and the rotation of arm 11 can cause gripper 12 to follow a desired trajectory and with desired speed and accelerations and in a flexible way according to the different armature and to the type of wire to be wound.

Notwithstanding reference has been made to an axis control for a corresponding control of the gripper, it is not excluded that the translation of the support for approaching/withdrawing and/or for forward/backward movement is operated by a linear motor, whereby at each position of the linear motor a position of the gripper univocally corresponds. This way, the transmission of the movement to the support of the gripper can be embodied by a man skilled in the art without departing from the scope of the present invention.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

What is claimed is:

1. An apparatus for temporarily gripping a wire in an armature winding machine, comprising:

an arm (11) connected to an actuator (13) and to a cutterless gripper (12) having means for gripping the wire;

a slide (14) connected to said actuator (13);

means for moving said gripper (12) between a first position where said gripper (12) is within a winding zone and a second position where said gripper (12) is outside said winding zone, wherein said means for moving said gripper (12) comprises a guide (15) and said slide (14) for translating said arm (11) integrally to said slide (14) so that said gripper (12) translates from said first to said second position and vice versa; and, said wire maintains a same angle with a hook for a commutator of said armature while said gripper (12) grips said wire and translates from said first position to said second position to cut said wire on said hook.

2. The apparatus according to claim 1, wherein said means for moving are associated with a driven axis (17) by a transmission means (19, 36, 37) so that at each angular position of said axis a position of the gripper (12) univocally corresponds intermediate between said first and second position.

3. The apparatus according to claim 1, wherein means are provided for controlling the translation of the gripper (12) by means of control of the rotation of said axis according to a predetermined function movement/time.

4. The apparatus according to claim 1, further comprising a driven axis (17) with a screw portion that crosses a joint (18) formed by a first and a second unit (32, 33) connected by means of a coupling (34), the first unit having a rotatable inner portion that is a nut screw put into rotation (19, 31) by a drive shaft (33), whereby if the first unit (32) is coupled to the second (33) there is the rotation of said driven axis (17), whereas if the first unit (32) is disengaged from the second (33) by means of said coupling (34), said driven axis (17) cannot rotate and said first and second units (32,33) translate integrally, causing the forward/backward movement of the driven axis (17).

5. An apparatus for temporarily gripping a wire in an armature winding machine, comprising:

an arm (11) connected to an actuator (13) and to a cutterless gripper (12) having means for gripping the wire, a slide (14) connected to said actuator (13);

means for moving said gripper (12) between a first position where said gripper (12) is within a winding zone and a second position where said gripper (12) is outside said winding zone, wherein a drive means is provided for operating the movement of said gripper (12) between said first position and said second position, said drive means for operating the movement of the gripper (12) being associated with a shaft (17, 42), whereby at each angular position of said shaft (17, 42) there is a corresponding position of said gripper (12).

* * * * *